US011454944B2

United States Patent
Lutz et al.

(10) Patent No.: US 11,454,944 B2
(45) Date of Patent: Sep. 27, 2022

(54) AUTOMATED CERTIFICATE MANAGEMENT

(71) Applicant: Siemens Aktiengesellschaft, Munich (DE)

(72) Inventors: Benjamin Lutz, Pfinztal (DE); Anna Palmin, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 757 days.

(21) Appl. No.: 16/390,832

(22) Filed: Apr. 22, 2019

(65) Prior Publication Data
US 2019/0324419 A1   Oct. 24, 2019

(30) Foreign Application Priority Data

Apr. 23, 2018 (EP) ...................... 18168766

(51) Int. Cl.
  *G05B 19/042* (2006.01)
  *H04L 9/32* (2006.01)
(52) U.S. Cl.
  CPC ........ *G05B 19/0425* (2013.01); *H04L 9/3263* (2013.01); *G05B 2219/14005* (2013.01); *G05B 2219/36542* (2013.01)
(58) Field of Classification Search
  CPC ...... G05B 19/0425; G05B 2219/14005; G05B 2219/36542; H04L 9/3263; H04L 9/0825; H04L 9/3268
  See application file for complete search history.

(56) References Cited

U.S. PATENT DOCUMENTS

| 7,266,849 B1* | 9/2007 | Gregory ............... G06F 21/575 |
| | | 713/193 |
| 2005/0071630 A1* | 3/2005 | Thornton ............. H04L 9/3226 |
| | | 713/156 |

(Continued)

FOREIGN PATENT DOCUMENTS

| CN | 1798157 | 7/2006 |
| CN | 101052970 | 10/2007 |

(Continued)

OTHER PUBLICATIONS

Office Action dated Oct. 9, 2021 issued in Chinese Patent Application No. 201910322037.9.

(Continued)

*Primary Examiner* — Tuan C Dao
(74) *Attorney, Agent, or Firm* — Cozen O'Connor

(57) ABSTRACT

A method for initially allocating and/or renewing certificates for devices and/or applications in a control system for a technical installation on the basis of certificates, wherein the devices and/or applications, within a framework of the initial allocation and/or renewal of the certificates, use a certificate management protocol to post a certificate request at at least one certification authority of the technical installation, where the devices and/or applications, in addition to the certificate management protocol, implement a certification service that generates a stateless alarm message and provides this generated stateless alarm message in the control system, when a certificate request previously posted by the device and/or the application is unanswered by the certification authority after expiration of a previously determined period of time.

10 Claims, 2 Drawing Sheets

(56) References Cited

U.S. PATENT DOCUMENTS

| | | | |
|---|---|---|---|
| 2005/0188053 A1* | 8/2005 | Shimamura | G06Q 10/00 |
| | | | 709/217 |
| 2006/0143442 A1* | 6/2006 | Smith | H04L 9/3271 |
| | | | 713/156 |
| 2006/0146862 A1 | 7/2006 | Lee | |
| 2009/0013177 A1 | 1/2009 | Lee et al. | |
| 2010/0042232 A1 | 2/2010 | Hildebrand et al. | |
| 2012/0131083 A1* | 5/2012 | Goddard | H04L 67/568 |
| | | | 709/201 |
| 2012/0239541 A1* | 9/2012 | Tsukahara | G06Q 40/02 |
| | | | 705/35 |
| 2015/0007139 A1* | 1/2015 | Beauchamp | G06F 11/3664 |
| | | | 717/124 |
| 2015/0113267 A1 | 4/2015 | Busser | |
| 2015/0312041 A1* | 10/2015 | Choi | G06F 21/33 |
| | | | 713/175 |
| 2019/0052456 A1* | 2/2019 | Bygrave | G06F 21/606 |
| 2019/0127080 A1* | 5/2019 | Selvarajan | B64D 45/00 |

FOREIGN PATENT DOCUMENTS

| | | |
|---|---|---|
| CN | 101340278 | 1/2009 |
| CN | 106454833 | 2/2017 |

OTHER PUBLICATIONS

Office Action dated Apr. 8, 2021 issued in Chinese Patent Application No. 18 168 766.6.

Eastlake Donald 3rd: "Transport Layer Security (TLS) Extensions: Extension Definitions-draft-ietf-tls-rfc4366-bis-01.txt", Motorola Laboratories, Internet Engineering Task Force, IETF; Standardworkingdraft, Internet Society (ISOC) 4, Rue Des Falaises CH-1205 Geneva, Switzerland, vol. tls, No. 1, XP015054012, chapter 1. "Introduction"; pp. 3-4, chapter 5. "Client Certificate URLs"; pp. 7-10; 2008.

* cited by examiner

AUTOMATED CERTIFICATE MANAGEMENT

BACKGROUND OF THE INVENTION

1. Field of the Invention

The invention relates to a certification service for a control system of a technical installation, a control system for a technical installation, as well as the use thereof in the technical installation and to a method for initially allocating and/or renewing certificates for devices and/or applications in a control system for the technical installation based on the certificates, where the devices and/or applications, within a framework of the initial allocation and/or renewal of the certificates, use a certificate management protocol to post a certificate request at at least one certification authority of the technical installation.

2. Description of the Related Art

In the context of a technical installation, what are known as operational certificates are used at runtime. By using the operational certificates, an authentication and a communication integrity of communication partners in a control system of the technical installation can be achieved by cryptographic measures.

In this context, a private key securely stored in a device is linked to an associated public key. Here, an automated supporting of the processes for administration of the operational certificates and the cryptographic keys associated therewith in the context of a public key infrastructure (PKI), in particular as a basis for a secure communication between applications and devices within the technical installation, is increasingly gaining more and more importance.

By reducing manual actions in the framework of the certificate administration and by way of increasingly automated processes based on standard protocols, in particular for rolling out and renewing certificates, it is possible to increase flexibility and interoperability in the context of the technical installation.

Conventionally, the automated administration of operational certificates in the context of the installation is realized through the use of a standard protocol, for example, the certificate management protocol (CMP). Here, the devices and applications request the necessary operational certificates situationally from what is known as a local registration authority (LRA). This occurs, for example, in the case of a renewal, which is required as a result of an expiration or a recall of the certificate.

Here, the devices and applications send a query to the local registration authority, what is known as the certificate signing request (CSR). The local registration authority checks the request by initially reviewing the validity of a signature used to sign the request. Subsequently, it checks whether a device certificate, a serial number and optionally further identification features of the devices or the applications is/are stored in what is known as a software inventory of the control system of the technical installation. In the event of a successful check, the request is forwarded to what is known as the certification authority (CA), which issues an operational certificate for the device or the application.

If an installation component or the local registration authority (LRA) determines, as a representative of the installation component, that one of the certificates issued for the component will soon expire, then the renewal of the certificate is to be performed as quickly as possible. Otherwise, there is a risk that communication partners of the component reject the expired certificate as invalid and as a consequence of this refuse the communication with the component. In a large, distributed technical installation with a modular construction, however, it cannot be guaranteed that the (local) registration authority always has an online connection with one or more project-specific certification authority/ies (CA) and/or with the individual installation components, such as the operator station (OS), or can establish such on demand in a timely manner.

A standard process of a certificate renewal in accordance with the certificate management protocol (CMP) provides that various messages, which are exchanged between instances participating in a certificate management (terminals, registration authorities (RA), certification authorities (CA)), are established according to the specification publication RFC4210/4211 (RFC=request for comments) of the Internet Engineering Task Force (IETF). For example, a certificate request (CertReq for short) that is generated for a terminal as a representative of the terminal or a registration authority, as a rule consists of the following contents:

A request ID (ID=identifier),

What is known as a certificate template, which contains various fields that can be listed later in the certificate (for example, a serial number of the terminal), What is known as a proof of possession (PoP for short), i.e., proof that the terminal also possesses a key for a secure transmission, and What is known as proof of origin, in order to be able to track an origin of the request.

In the event that the online connection between the installation components and the (local) registration authority and/or the (local) registration authority and the responsible certification authority or a plurality of responsible certification authorities is frequently interrupted, the (local) registration authority cannot satisfactorily perform its coordination tasks.

In the specification RFC4210, what is known as a polling between the installation components, (local) registration authority and the responsible certification authority or a plurality of responsible certification authorities is recommended as a countermeasure for bridging offline states: one instance attempts to reach the other by sending what is known as the poll request until the other responds. In the technical installation, however, on the one hand this unnecessarily increases the communication complexity and thus in some circumstances compromises the availability of the individual components and the overall installation.

Furthermore, it is not possible to cause an escalation, i.e., a high prioritization of the unavailable online connection, via the polling in accordance with the specification. In particular, no further instances/users are informed about the unavailable online connection, meaning that the online connection necessary for the certificate renewal cannot be established immediately (even in urgently required cases).

Technically, it is possible with a high complexity and correspondingly high investment to use adequate measures (for example, a redundant design of (local) registration authority/certification authority/ies and an implementation of adequate load-balancing mechanisms to guarantee a high availability of the instances as well as a steady online connection therebetween, so that a certificate can be renewed as immediately or quickly as possible if necessary. This, however, is associated with enormous additional costs, which cannot be invested by all operators of automation installations.

SUMMARY OF THE INVENTION

In view of the foregoing, it is therefore an object of the invention to provide an improved certificate management for a control system of a technical installation, that can initiate an automated allocation of certificates in an event-controlled and situational manner if necessary.

This and other objects and advantages are achieved in accordance with the invention by a method for initially allocating and/or renewing certificates for devices and/or applications in a control system for a technical installation based on the certificates, by a certification service for a control system of the technical installation, by a control system for the technical installation in accordance, and by the use thereof in the technical installation.

In a method of the kind described in the introduction, the object is achieved in accordance with the invention in that the devices and/or applications, in addition to the certificate management protocol, implement a certification service that generates an, in particular stateless, alarm message and provides it in the control system, when a certificate request previously posted by the respective device and/or the respective application has not been answered by the certification authority after a previously determined period of time has expired.

In the present context, a control system is understood to be a computer-aided technical system, which comprises functionalities for representing, operating and controlling a technical manufacturing and production installation. The control system comprises in the present case sensors for determining measured values, as well as various actuators. Additionally, the control system comprises what are known as process or manufacture-oriented components, which serve to activate the actuators or sensors. Furthermore, the control system has inter alia means for visualizing the technical installation and for engineering. The term control system is additionally intended to also encompass further computer units for more complex regulations and systems for data storage and processing.

A technical installation is a plurality of machines, devices, applications and the like, which have a functional and often also spatial relationship with one another. With the installation, products, components and the like are generated or manufactured with (commercial) technical dimensions.

A certificate is understood to be a digital data record, which confirms certain properties (in this case of machines, devices, applications and the like). An authenticity and integrity of the certificate can be verified via cryptographic methods, as a rule.

The certificate management protocol used by the devices and/or (web) applications is an established protocol that is conventionally used in the context of a certificate management for a control system. For example, this may be the certificate management protocol (CMP) that is described in the specification publication RFC4210/4211 Request for Comments (RFC) of the Internet Engineering Task Force (IETF).

The certification authority of the technical installation publishes the (digital) certificates (provision/assignment) and reviews the validity thereof (integrity assurance). The certification authority forms the core of a public key infrastructure (PKI) of the technical installation. It is also referred to as the certification authority (CA).

In accordance with the invention, in addition to the notifications exchanged for the purposes of issuing the certificate as standard in accordance with the chosen certificate management protocol (for example the CMP protocol), what is known as a certification service is provided. This certification service is established to make it possible to establish the (online) connection between a device/an application and the certification authority in as timely a manner as possible for an urgent issuing of the certificate if necessary.

If a certificate request certificate signing request (CSR) of a device or an application to the certification authority remains unanswered after a previously determined period of time has expired (configurable timeout), then the certification service reports this circumstance to the control system via an alarm message generated by itself and stored in the control system.

The alarm message can advantageously be stateless. The term "stateless alarm message" is understood in the present case to be an alarm message, the content of which is exclusively an external state. In the present case, this means that the stateless alarm message only contains an item of information regarding the fact that a certificate request of a device or an application has not been answered after a previously determined period of time has expired. The stateless alarm message has no state information relating to itself as is usually the case for example in process alarms (for example, "message arrived", "message acknowledged" or "message departed").

The certification service is only then active when requested certificate requests remain unanswered and (manual or automatic) interventions are required for the purpose of establishing the (online) connection with an available certification authority. Preferably, the stateless alarm message has an item of urgency information, in order to assign the alarm message a higher priority.

Should it prove impossible for technical (or network-related) reasons to establish the (online) connection, the certification request can also be transmitted to the certification authority another way (e.g., manually or by e-mail). If the necessary certificate is issued by the certification authority before the previously determined period of time expires, and it is delivered to the device/the application, then the certification service does not generate an alarm message.

The control system-specific certification service makes it possible (as an inventive embodiment of a certificate management implemented in the control system as standard) for the issuance of the certificate to be able to occur in an event-controlled and situational manner, if necessary. The online connection required for this between a device and the certification authority is either established in a fully automatic or semi-automatic manner, such as initiated by an operator of the technical installation or of the system, who has obtained the corresponding stateless alarm message of the certification service.

With the described solution, the automated certificate management is formed in a more reliable, intelligent and flexible manner by dispensing with unnecessary polling and a highest-possible availability of the technical installation associated with high costs, as well as a permanent connection (online) between the devices/applications and the certification authority.

The solution described additionally enables a flexible linking with customary CA products and supports (due to the use of standard protocols for the certificate management) all conventional certificate management use cases (in particular bootstrapping, updating, revocation, hardware exchange). Thus, it conforms with the PKI-relevant requirements of the IEC 62443 standard as the leading international security standard for technical automation.

The method in accordance with the invention can be applied to the revocation of a certificate that is no longer valid for various reasons (for example, as a result of a device swap at runtime of the installation). Preferably, however, the posting of the certificate request occurs in the framework of a certificate renewal of the devices and/or applications.

To post the certificate request at the at least one certification authority of the technical installation, at least one intermediary registration service (also referred to as registration authority (RA)) can be used. The intermediary registration authority/ies may be local registration authority/ies, which communicate with a higher-level global registration authority, which in turn has a direct connection with the at least one certification authority of the technical installation. As a result, an interruption source can be localized in fine detail within a chain "device/application->registration authority->certification authority" and correspondingly taken into consideration, as well as eliminated in a timely manner with the aid of the certificate service or circumvented with the aid of other adequate mechanisms.

The certification service can be implemented at the registration authority/ies. Should a device or an application be unable to reach the registration authority/ies, or no response from the certification authority has been obtained (via the intermediary registration authority) after the previously determined period of time has expired, the certification authority implemented on the device or the application is invoked.

If, however, it is not possible to establish an (online) connection between the registration authority (local or global) and the certification authority, then the certification service in the registration authority (local or global) is required.

In an advantageous embodiment of the invention, the certification service generates a resolution message after the stateless alarm message is generated and provided, and provides this in the control system. This, however, only occurs once the certificate request previously posted by the device, the application or the registration authority has been answered by the certification authority, i.e., the certificate request has either been accepted or rejected. With the resolution message, each partner in the control system or the technical installation knows that the alarm message has been resolved.

In the context of a further preferred embodiment of the invention, the stateless alarm message and/or the resolution message is stored in an archive. The archive may be a central process data archive (process historian), which can be reached by the partners of the control system or of the technical installation. In this context, the archive does not necessarily have to be located physically within the installation, but rather the archive can also be realized in an external server environment. Operators, maintenance personnel and other users of a technical installation, by corresponding filtering of the archive with regard to the certificate-related stateless alarm messages, can track a history of the alarm messages and check whether further certificate requests are still open, i.e., are unanswered, which could possibly lead to disturbances to the installation.

By archiving the alarm message and/or the resolution message, a downstream auditing of the certificate management is furthermore possible (what is known as an audit trail). Here, it is possible to check in particular whether certificate-related disturbances of the technical installation have occurred.

In addition, a device maintenance that is typical of the method (for example, an identification of device failures or a maintenance requirement) can be expanded by a "certificates" category, as all the information relating to the certificate management is immediately accessible.

Preferably, the registration authority can have access to the archive and there automatically search for unanswered certificate requests and forward these to the certification authority. It is also possible, however, for the certification authority to have direct, immediate access to the archive with the alarm and/or resolution messages stored there.

It is also an object of the invention to provide a certification service for a control system of a technical installation, which can be used by devices and/or applications and/or registration authorities of the technical installation and which is configured to generate a stateless alarm message and to provide it in the control system when a certificate request that has been previously posted by a device, an application or a registration authority has not been answered by a certification authority of the control system within a previously determined period of time.

The certification service is advantageously additionally configured, after the generation and provision of the stateless alarm message, to generate a resolution message and to provide the Generated Resolution Message in the control system. The condition for this is that the certificate request previously posted by the device, the application or the registration authority has been answered by the certificate authority of the control system.

It is also an object of the invention to also provide a control system for a technical installation, which comprises means for implementing the method in accordance with the disclosed embodiments of the invention and/or means for implementing the certification service in accordance with the disclosed embodiments of the invention.

Preferably, the control system is used to operate a technical installation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now be described more clearly and intelligibly in conjunction with the following description of the exemplary embodiment, which will be described in detail making reference to the drawings, in which.

DETAILED DESCRIPTION OF THE EXEMPLARY EMBODIMENTS

Figure 1:
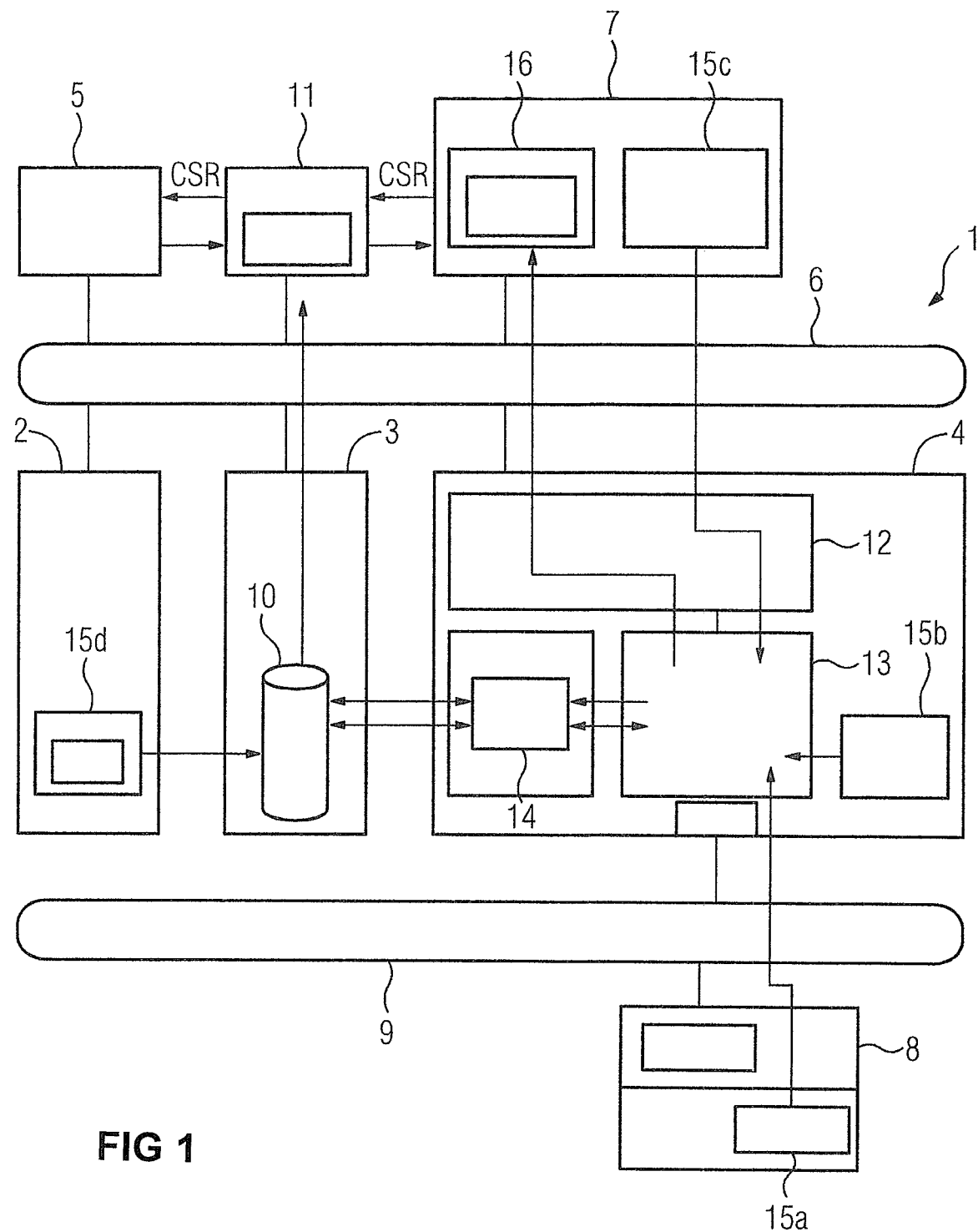
FIG. 1 is a schematic block diagram of the control system in accordance with the invention.

Shown in FIG. 1 is a control system 1 in accordance with the invention of a technical installation formed as a procedural installation. The control system 1 comprises an engineering component or an engineering station 2, a process data archive or a process historian 3, an operator system server 4, a registration authority 11 and a certification authority 5. The engineering station 2, the process data archive 3, the operator system server 4, the registration authority 11 and the certificate authority 5 are connected to one another via a terminal bus 6. A user or client 7 is connected to the previously mentioned four components via the terminal bus 6. The terminal bus 6 can be configured as an industrial Ethernet, for example, without being restricted to this.

A device 8 is linked to the operator system server 4 via an installation bus 9. The linked device 8 may alternatively be an application, in particular web application. In the context of the invention, any number of devices and/or applications may be linked to the operator system server 4. The installation bus 9 can be configured as an industrial Ethernet, for example, without being restricted to this. The device 8 in turn can be connected to any number of subsystems (not shown).

Integrated in the process data archive 3 is a central archive 10, in which inter alia certificates and messages are stored and can be called again.

Integrated in the operator system server 4 is a visualization service 12, via which a transmission of authentication data or certificates to the client 7 can occur. Additionally, the operator system server 4 has a process image 13 and memory management (storage framework) 14.

All the devices 8 or applications integrated in the technical installation must authenticate themselves against the registration authority 11 on commissioning of the technical installation, in order to be registered as trustworthy communication partners. To this end, the devices/applications 8 send a request for the compilation of a certificate, i.e., a certificate signing request (CSR). The request of the devices or application 8 is checked by the registration authority 11. In the event of a successful check, the request is provided with a signature of the registration authority 11 and subsequently forwarded to the certification authority 5, which likewise checks it.

In the event of a successful check, the registration authority 11 holds the corresponding certificate as a representative of each device or each application 8. The checking by the registration authority 11 particularly aims to monitor whether the device or the application 8 is valid as trustworthy communication partners in the context of the technical installation, i.e., are particularly stored as such in the process data archive 4.

Moreover, certain criteria are used to check whether the certificate signing request (CSR) is correct. The certification authority 5 checks whether the forwarded requests are signed by a trustworthy registration authority 11 and (on the basis of the certain criteria) whether the certificate signing request is correct in the context of the certification authority 5. In the event of a successful check, the registration authority 11 obtains the corresponding certificate as a representative of each device or each application 8.

In this context, the administration of the certificate occurs while using a conventional certificate management protocol (CMP), for example.

In the context of the present invention, the device 8 additionally implements a first certification service 15a, the process image 13 of the operator system server 4 implements a second certification service 15b, a user or client 7 implements a third certification service 15c and the engineering station 2 implements a fourth certification service 15d. The certification services 15a, 15b, 15c, 15d each generate a stateless alarm message if a previously posted certificate request has not been answered by the certification authority 5 after a previously determined period of time has expired. These alarm messages can be called or read out by the other partners in the control system 1.

Once the previously posted certificate request has been answered by the certification authority 5, the certification service generates a resolution message and provides this to the other partners in the control system 1.

The alarm messages consist of the following contents:

An expiration date, on which the relevant certificate to be renewed expires and must be replaced, A query data, on which the certificate request was initiated, An item of urgency information, in order to assign the alarm message a higher priority. If, for example, required operational certificates or device certificates stored in the devices are not renewed within a predefined time frame, then the certification service can increase the processing priority of the certificate request ("escalation"), A device identifier (serial number or other unique identification), and A device path for simple localization of the device in question.

The stateless alarm messages and the resolution messages are stored by the certification services 15a, 15b, 15c, 15d in the central archive 10. By way of a display element 16, which is integrated in the client 7, a status of the alarm messages or resolution messages can be queried and represented, in order to perform an audit trail for example.

Figure 2:
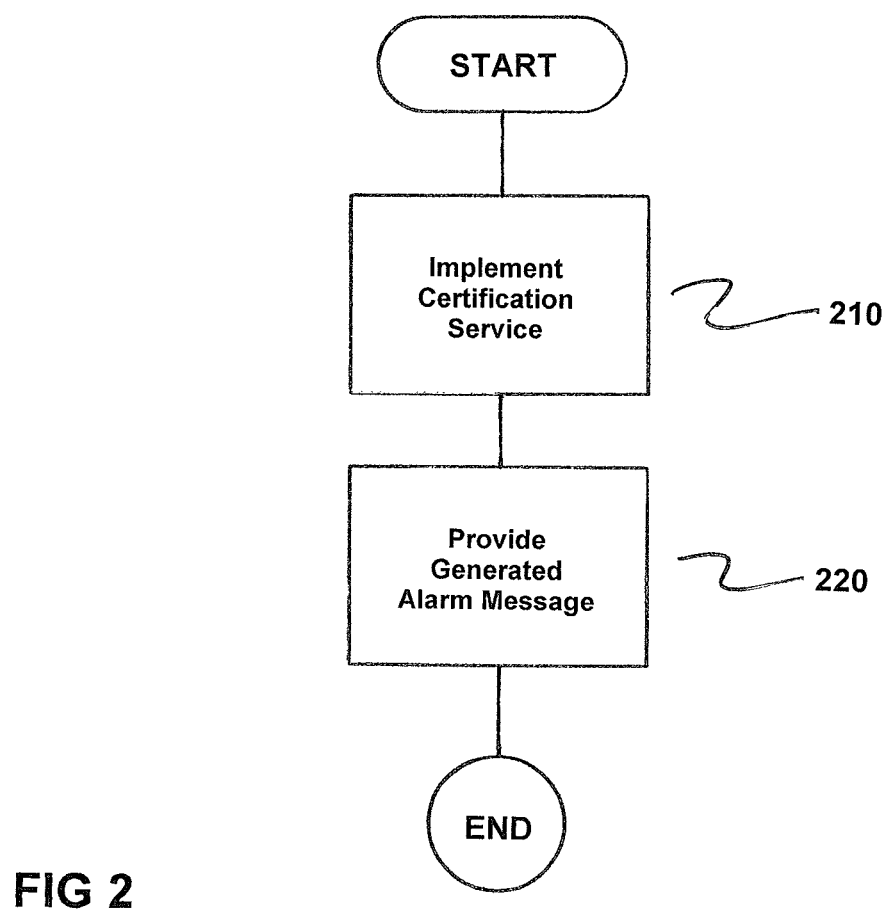
FIG. 2 is a flowchart of the method in accordance with the invention.

FIG. 2 is a flowchart of a method for initially allocating and/or renewing certificates for devices and/or applications 8 in a control system 1 for a technical installation based on the certificates, where the devices and/or applications 8, within a framework of the initial allocation and/or renewal of the certificates, use a certificate management protocol to post a certificate request at at least one certification authority 5 of the technical installation. The method comprises implementing, by the devices and/or applications 8, in addition to the certificate management protocol, a certification service 15a, 15b, 15c, 15d that generates a stateless alarm message, as indicated in step 210.

Next, the generated alarm message is provided in the control system 1, when a certificate request previously posted by at least one of the device and the application 8 is unanswered by the certification authority 5 after expiration of a previously determined period of time, as indicated in step 220.

Although the invention has been illustrated and described in detail with the preferred exemplary embodiment, the invention is not restricted by the examples disclosed and other variations can be derived therefrom by a person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for at least one of initially allocating and renewing certificates for at least one of devices and applications in a control system for a technical installation based on the certificates, at least one of the devices and applications, within a framework of at least one of the initial allocation and renewal of the certificates, utilizing a certificate management protocol to post a certificate request at at least one certification authority of the technical installation, the method comprising:

implementing, by at least one of the devices and applications, in addition to the certificate management protocol, a certification service which generates a stateless alarm message; and providing said generated alarm message in the control system, when a certificate request previously posted by at least one of the device and the application is unanswered by the certification authority after expiration of a previously determined period of time.

2. The method as claimed in claim 1, wherein in order to post the certificate request at the at least one certification authority of the technical installation, at least one intermediary registration service is utilized, which implements the certification service as claimed in claim 1.

3. The method as claimed in claim 2, wherein the certification service generates a resolution message after the stateless alarm message is generated and provided and provides said resolution message in the control system, once a certificate request previously posted by at least one of the device and application has been answered by the certification authority.

4. The method as claimed in claim 1, wherein the certification service generates a resolution message after the stateless alarm message is generated and provided and provides said resolution message in the control system, once a certificate request previously posted by at least one of the device and application has been answered by the certification authority.

5. The method as claimed in claim 1, wherein the stateless alarm message has an item of urgency information to assign the stateless alarm message a higher priority.

6. The method as claimed in claim 1, wherein at least one of the stateless alarm message and the resolution message are stored in an archive.

7. The method as claimed in claim 1, wherein posting of the certificate request occurs in a framework of a certificate renewal of at least one of the devices and applications.

8. A certification service for a control system of a technical installation, said certification service including a processor and being utilizable by at least one of devices and applications of the technical installation and being configured to generate a stateless alarm message and to provide said generated stateless alarm message in the control system when a certificate request previously posted by at least one of a device and an application is unanswered by a certification authority of the control system within a previously determined period of time; and wherein the certification service is further configured to generate a resolution message after generating and providing the stateless alarm message and provide said generated resolution message in the control system, in an event that a certificate request previously posted by at least one of the device and application has been answered by the certification authority of the control system.

9. A control system for a technical installation, comprising:

an engineering station;
   a process data archive including a central archive;
   an operator system server including a visualization service, a process image and memory management;
   a registration authority;
   a certification authority, the engineering station, the process data archive, the operator system server, the registration authority and the certificate authority being interconnected to one another via a terminal bus;
   a client connected to the engineering station, the process data archive, the operator system server and the registration authority via the terminal bus;
   a device linked to the operator system server via an installation bus, said device implementing a certification service;
   wherein the control system is configured to:
      implement, by the devices, in addition to a certificate management protocol, a certification service which generates a stateless alarm message; and
      provide said generated alarm message when a certificate request previously posted by the device and is unanswered by the certification authority after expiration of a previously determined period of time; and
   wherein a certification service for the control system of the technical installation, which is utilizable by the device of the technical installation, is configured to generate a stateless alarm message and to provide said generated stateless alarm message when a certificate request previously posted by the device is unanswered by a certification authority within a previously determined period of time.

10. The control system as claimed in claim 9, wherein the control system operates the technical installation.

* * * * *